(12) United States Patent
Armstrong et al.

(10) Patent No.: US 8,489,763 B2
(45) Date of Patent: *Jul. 16, 2013

(54) DISTRIBUTED VIRTUAL BRIDGE MANAGEMENT

(75) Inventors: William J. Armstrong, Rochester, MN (US); Claude Basso, Raleigh, NC (US); Josep Cors, Rochester, MN (US); David R. Engebretsen, Cannon Falls, MN (US); Kyle A. Lucke, Oronoco, MN (US); Jeffrey J. Lynch, Apex, NC (US); Bruce M. Walk, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 503 days.

This patent is subject to a terminal disclaimer.

(21) Appl. No.: 12/763,306

(22) Filed: Apr. 20, 2010

(65) Prior Publication Data

US 2011/0258340 A1 Oct. 20, 2011

(51) Int. Cl.
*G06F 15/173* (2006.01)

(52) U.S. Cl.
USPC .......................................... 709/238; 709/243

(58) Field of Classification Search
USPC ................. 709/238, 243, 244, 230, 232, 236, 709/220–226, 229; 370/216, 217, 220, 242, 370/244, 380, 419
See application file for complete search history.

(56) References Cited

U.S. PATENT DOCUMENTS

| | | | |
|---|---|---|---|
| 6,802,068 B1 * | 10/2004 | Guruprasad | .................. 719/319 |
| 6,807,172 B1 | 10/2004 | Levenson et al. | |
| 6,980,547 B1 | 12/2005 | Gally et al. | |
| 7,107,360 B1 | 9/2006 | Phadnis et al. | |
| 7,138,733 B2 | 11/2006 | Sanders et al. | |
| 7,167,922 B2 | 1/2007 | Narayanan | |
| 7,751,416 B2 * | 7/2010 | Smith et al. | ................... 370/410 |
| 7,756,027 B1 | 7/2010 | Reddy et al. | |
| 7,876,746 B1 * | 1/2011 | Pannell et al. | ................ 370/373 |
| 7,889,728 B2 | 2/2011 | Arad et al. | |
| 7,992,149 B2 * | 8/2011 | Carollo et al. | ................ 718/102 |
| 8,085,791 B1 | 12/2011 | Aggarwal et al. | |
| 8,090,805 B1 | 1/2012 | Chawla et al. | |
| 8,121,126 B1 | 2/2012 | Moisand et al. | |
| 8,190,960 B1 | 5/2012 | Bahadur et al. | |
| 8,194,534 B2 | 6/2012 | Pandey et al. | |

(Continued)

FOREIGN PATENT DOCUMENTS

| | | |
|---|---|---|
| WO | WO 2006 093929 A2 | 9/2006 |
| WO | WO 2009 085536 A2 | 7/2009 |

OTHER PUBLICATIONS

IBM Patent U.S. Appl. No. 12/763,323 entitled "Remote Adapter Configuration," filed Apr. 20, 2010 by William J. Armstrong et al.

(Continued)

*Primary Examiner* — Wing Chan
*Assistant Examiner* — Ruolei Zong
(74) *Attorney, Agent, or Firm* — Toler Law Group

(57) ABSTRACT

Systems and methods to forward data frames are described. A particular method may include receiving a data frame at a switch of a plurality of networked switches coupled to a plurality of server computers. The data frame may be forwarded from a controlling bridge coupled to the plurality of networked switches. The data frame may be determined to include management data, and an operating parameter of the switch may be modified.

25 Claims, 7 Drawing Sheets

U.S. PATENT DOCUMENTS

| | | |
|---|---|---|
| 2003/0037163 A1 | 2/2003 | Kitada et al. |
| 2004/0037279 A1 | 2/2004 | Zelig et al. |
| 2006/0023708 A1 | 2/2006 | Snively et al. |
| 2006/0149886 A1 | 7/2006 | Chen et al. |
| 2006/0248158 A1 | 11/2006 | Ha et al. |
| 2007/0067432 A1 | 3/2007 | Tarui et al. |
| 2007/0147368 A1* | 6/2007 | Desai et al. ............ 370/389 |
| 2007/0260910 A1 | 11/2007 | Jain et al. |
| 2007/0299987 A1 | 12/2007 | Parker et al. |
| 2008/0002579 A1 | 1/2008 | Lindholm et al. |
| 2008/0056300 A1 | 3/2008 | Williams |
| 2008/0159260 A1 | 7/2008 | Vobbilisetty et al. |
| 2008/0159277 A1 | 7/2008 | Vobbilisetty et al. |
| 2008/0275975 A1* | 11/2008 | Pandey et al. ............ 709/223 |
| 2009/0161692 A1 | 6/2009 | Hirata et al. |
| 2009/0213869 A1 | 8/2009 | Rajendran et al. |
| 2009/0252181 A1 | 10/2009 | Desanti |
| 2009/0254677 A1 | 10/2009 | Desanti |
| 2009/0265501 A1* | 10/2009 | Uehara et al. ............ 710/312 |
| 2009/0276526 A1 | 11/2009 | Carlson et al. |
| 2009/0323518 A1 | 12/2009 | Rose et al. |
| 2010/0067374 A1 | 3/2010 | Elangovan et al. |
| 2010/0085966 A1 | 4/2010 | Samuels et al. |
| 2010/0128605 A1 | 5/2010 | Chavan et al. |
| 2010/0150174 A1 | 6/2010 | Bhide et al. |
| 2010/0257269 A1 | 10/2010 | Clark |
| 2011/0061094 A1 | 3/2011 | Salkewicz |
| 2011/0069710 A1 | 3/2011 | Naven et al. |
| 2011/0085557 A1 | 4/2011 | Gnanasekaran et al. |
| 2011/0153715 A1 | 6/2011 | Oshins et al. |
| 2011/0243134 A1 | 10/2011 | Armstrong et al. |
| 2011/0243146 A1 | 10/2011 | Armstrong et al. |
| 2011/0258340 A1 | 10/2011 | Armstrong et al. |
| 2011/0258641 A1 | 10/2011 | Armstrong et al. |
| 2011/0261687 A1 | 10/2011 | Armstrong et al. |
| 2011/0261815 A1 | 10/2011 | Armstrong et al. |
| 2011/0261826 A1 | 10/2011 | Armstrong et al. |
| 2011/0261827 A1 | 10/2011 | Armstrong et al. |
| 2011/0262134 A1 | 10/2011 | Armstrong et al. |
| 2011/0320671 A1 | 12/2011 | Armstrong et al. |

OTHER PUBLICATIONS

Hufferd, John L., "Proxy Based Shortcut, Hufferd Enterprises", Oct. 7, 2009, (21 pgs).

Cisco Systems, "The Adaptive Architecture for the Data Center Network", 2007, (3 pgs).

Cisco Systems, "Integrating the Cisco Catalyst Blade Switch 3130 for Dell PowerEdge M1000e Blade Enclosure into the Cisco Data Network Architecture—Design Guide," Oct. 2007, retrieved from the Internet http://cisco.com/en/US/prod/collateral/switches/ps6746/ps8742/pas8764/white_paper_c07-443792.pdf [retrieved on Sep. 21, 2011], (29 pgs).

U.S. Appl. No. 12/767,174, Non-Final Office Action dated Feb. 23, 2012; (13 pgs).

U.S. Appl. No. 12/751,249, Non-Final Office Action dated Oct. 12, 2012; (19 pgs).

U.S. Appl. No. 12/767,506, Non-Final Office Action dated Jan. 18, 2013; (8 pgs).

* cited by examiner

DISTRIBUTED VIRTUAL BRIDGE MANAGEMENT

I. FIELD OF THE DISCLOSURE

The present disclosure relates generally to data communications, and more specifically, to managing switches in a highly integrated computer network.

II. BACKGROUND

Server computers are continuously managed to enable access to shared switches and other traffic routing resources. For example, contention for routing resources may exist when server computers are housed within racks for space and connectivity considerations, such as in a blade server computer arrangement. The server computers may experience transmission bottlenecks and delays when forwarding data frames through centralized switches, such as shared top of rack switches.

To illustrate, FIG. 1 shows a conventional blade server computer system 100. The system 100 includes a plurality of server computers 106-125 housed within racks 102, 104 and arranged into chassis 138, 140, 142, and 144. An illustrative server computer 106 may include a half-width information technology element (ITE) blade server computer.

Data frame communications between the server computers 106-125 housed within different chassis 138, 140, 142, 144 or racks 102, 104 may be referred to as east-west connectivity. For example, the server computer 111 of a first chassis 140 may forward a data frame to the server computer 106 of another chassis 138 via a path 164. The path 164 includes a chassis switch 154 and a top of rack switch (TOR) 158. The chassis switch 154 and the top of rack switch 158 route the data frame based upon a media access control (MAC) address.

When the server computer 111 of the rack 102 forwards a data frame to the server computer 123 of the rack 104, the data frame travels through paths 166 and 168. The paths 166 and 168 include the top of rack switch 158, an end of rack switch (EOR) 162, and a top of rack switch 160. The top of rack switch 158 is again used when the server computer 111 attempts north-south connectivity (i.e., internal to external data frame communication) through paths 166 and 170. Because the data frames in the above examples are all routed through the top of rack switches 158, 160, a potential bottleneck scenario can result.

Increasing the number of switches and associated connections to accommodate additional traffic may present configuration and management challenges, as well as increase hardware costs and latency. It is therefore desirable to increase the efficiency with which switches may forward data frames between server computers.

III. SUMMARY OF THE DISCLOSURE

In a particular embodiment, an apparatus is disclosed that includes a plurality of server computers and a plurality of networked switches coupled to the plurality of server computers. The plurality of networked switches may be configured to forward a data frame between the plurality of server computers. A controlling bridge may be coupled to and configured to program the plurality of networked switches.

In another embodiment, a method for programming a switch is disclosed. The method includes receiving a data frame at a switch of a plurality of switches coupled to a plurality of server computers. The data frame may be forwarded from a controlling bridge coupled to the plurality of switches. The data frame may be determined to include management data, and an operating parameter of the switch may be modified.

In another embodiment, a method is disclosed that includes generating a management frame at a controlling bridge. The management frame may be configured to modify an operating parameter of a switch of a plurality of switches coupled to the controlling bridge and may include a protocol identifying the management frame to the switch element. The management frame may be forwarded to the switch.

In another embodiment, a program product includes program code resident at a switch of a plurality of switches coupled to a plurality of server computers and configured to determine that a data frame includes management data and to modify an operating parameter of the switch. The program product further includes a computer readable medium bearing the program code.

At least one of the embodiments may allow efficient programming of switches in a highly integrated environment. The automated switch configuration may reduce potential bottlenecks and facilitate efficient processing. Fiber Channel over Ethernet may be supported, and an embodiment of a system may be scalable to include hundreds or more server computers with direct connectivity.

Features that characterize embodiments of the invention are set forth in the claims annexed hereto and forming a further part hereof. However, for a better understanding of embodiments of the invention, and of the advantages and objectives attained through its use, reference should be made to the Drawings and to the accompanying descriptive matter in which there are described exemplary embodiments of the invention.

IV. BRIEF DESCRIPTION OF THE DRAWINGS

V. DETAILED DESCRIPTION

Figure 1:
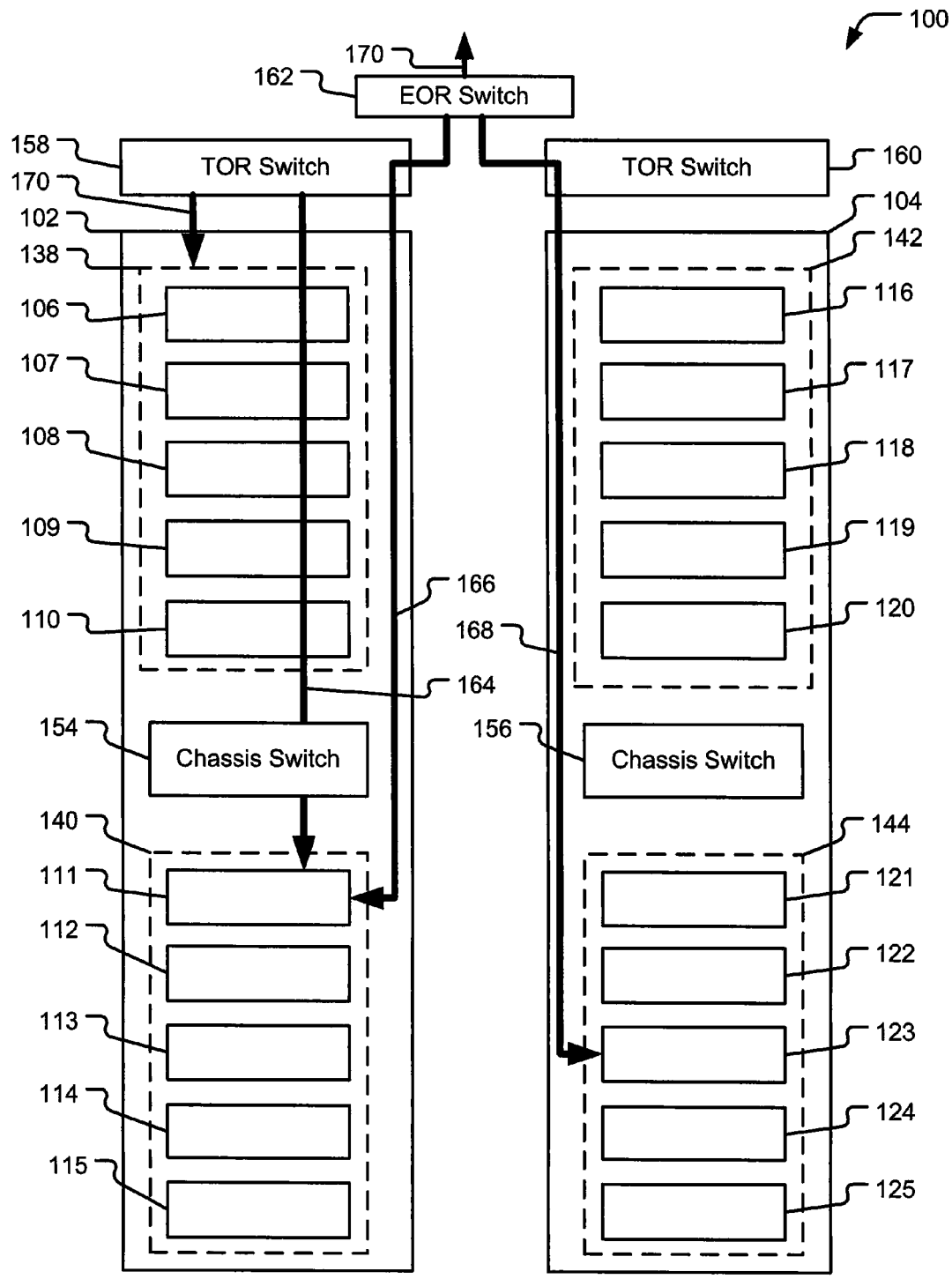
FIG. 1 is a block diagram of a prior art computing system that includes racks of blade server computers.

Data frame communication may be improved by efficiently managing switches of a highly integrated and scalable network. Operating parameters of switches may be automatically configured by firmware of a controlling bridge. For example, the controlling bridge may forward management frames to the switches. The management frames may include a specified Ether Type that is associated with a management protocol.

The switches may include Virtual Ethernet Bridges (VEBs). The VEBs may be implemented in hardware. For example, the switches may include bridge elements of a distributed virtual bridge and a VEB of an adapter. The switches may be stacked (e.g., coupled directly via a cable connection). Each switch may function as a low latency, high speed switch. Microprocessors connected across an interconnect fabric may send management frames to bridge firmware. This automation may improve efficiency over conventional processes that manually configure individual Layer 2 switches.

The network may include data and management planes. For example, data frames may be forwarded with a first protocol, such as Fiber Channel over Ethernet (FCoE). A second protocol of the management frames may be used for the management plane. The second protocol (e.g., the management protocol) may include the preset Ether Type that is incorporated into an Ethernet data frame to identify the protocol of the management frame. Use of the different protocols may allow the same network to be used for data forwarding and switch configuration operations.

The switches may be assigned Media Access Control (MAC) addresses. A virtual local area network (VLAN) may connect the switches. Each VLAN may represent an isolated storage area network (SAN). Each SAN may include an initiator information technology element (ITE) and a target ITE (e.g., a storage ITE). The ITEs may connect to an Ethernet network via a converged network adapter. The converged network adapter (e.g., a single root I/O virtualization adapter) may implement FCoE protocol for (non-management) data frames.

The controlling bridge(s) may be remotely coupled to the switches. Multiple controlling bridges may be distributed and synchronized throughout the network. For example, the controlling bridges may share domain knowledge of network management parameters. A controlling bridge may communicate with switches sending and receiving the management frames. The distributed virtual bridge may route the management frames to and from the switches. The controlling bridge and other firmware of the distributed virtual bridge may further exclude external traffic from configuring the switches.

An embodiment of a bridge element may work in combination with the controlling bridge to achieve routing efficiencies in firmware and hardware, which may provide a larger bandwidth and faster processing than software applications. Each switch may identify data frames that include the management protocol. The management frames may be used to program operating parameters of the switches.

Figure 2:
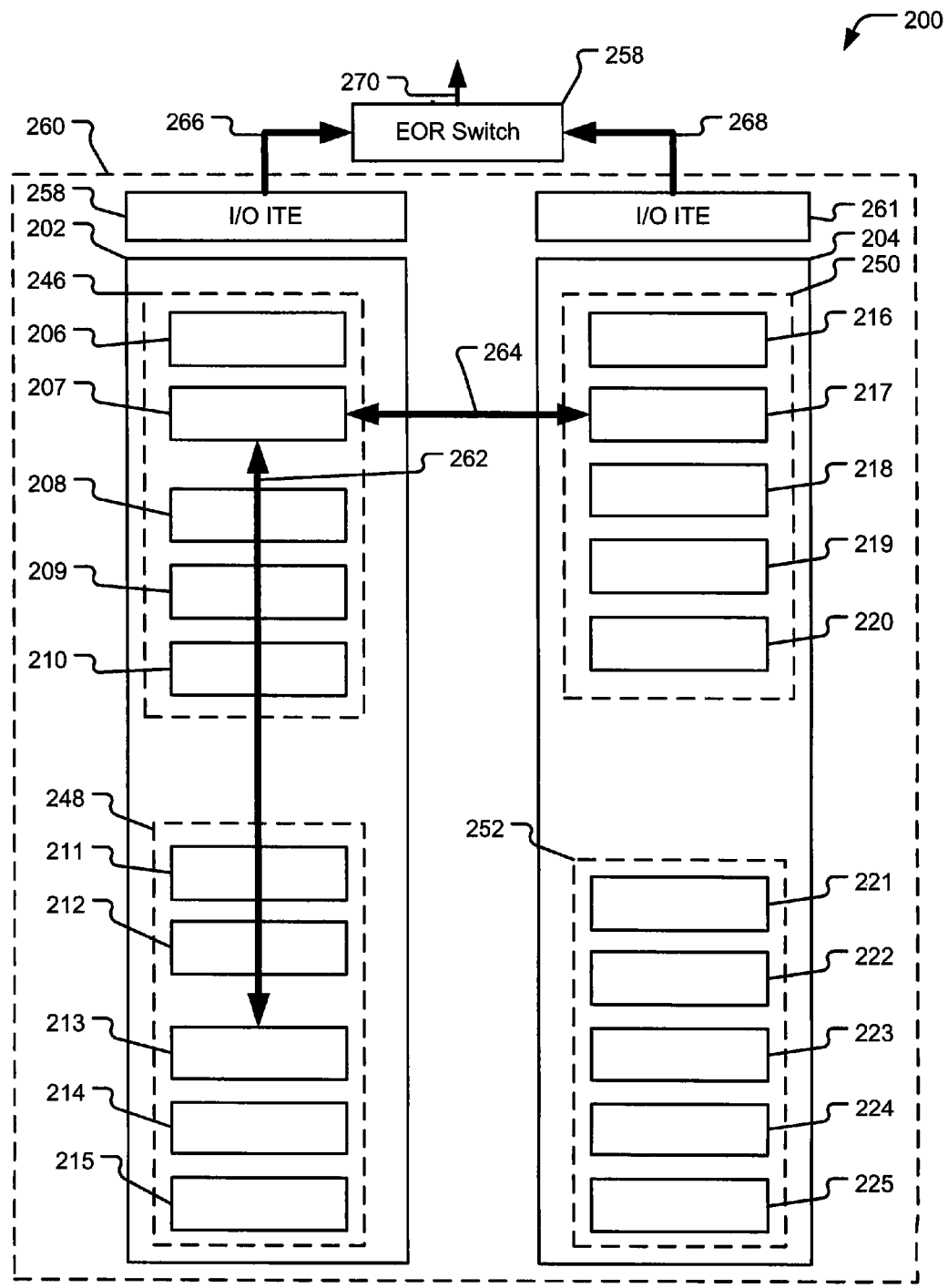
FIG. 2 is a block diagram of an embodiment of a networked computing system configured to allow direct communication between server computers housed within different racks and chassis of blade server computers.

Turning particularly to the drawings, FIG. 2 shows an illustrative embodiment of a highly integrated system 200 configured to forward data frames using a distributed virtual bridge 260. The distributed virtual bridge 260 may extend across server computers 206-225, chassis 246, 248, 250, 252, and racks 202, 204 to provide data link layer (i.e., Layer 3) switching between bridge elements. The bridge elements may provide a frame-based, Ethernet-like interface. The interface may facilitate lossless, point-to-point, in-order frame delivery between server computers 206-225 of different racks 202, 204 or chassis 246, 248, 250, 252 (i.e., east-west connectivity) with reduced redundancy and latency.

The system 200 further includes an end-of-rack switch 258 and input/output (I/O) server ITEs 259, 261 that enable north-south connectivity. The I/O server ITEs 259, 261 may enable uplink connectivity to the external Ethernet network (or other network) for the server computers 206-225 housed within the racks 202, 204.

An arrow 264 of FIG. 2 represents direct east-west connectivity and the flow of data frames between server computers located in different racks 202, 204 of the system 200 (e.g., without using a top of rack or chassis switch). An arrow 262 represents direct east-west connectivity across different chassis 246, 248 of the rack 202.

The system 200 of FIG. 2 may enable direct connectivity between server computers of different racks or chassis. To accommodate the relatively high level of system integration, data frames may be forwarded to distributed Fiber Channel Forwarders. The associated distribution of processing and data may streamline the routing of data frames. The inclusion of the Fiber Channel Forwarders within the distributed virtual bridge 260 may reduce contention for resources and increase data frame traffic flow.

Figure 3:
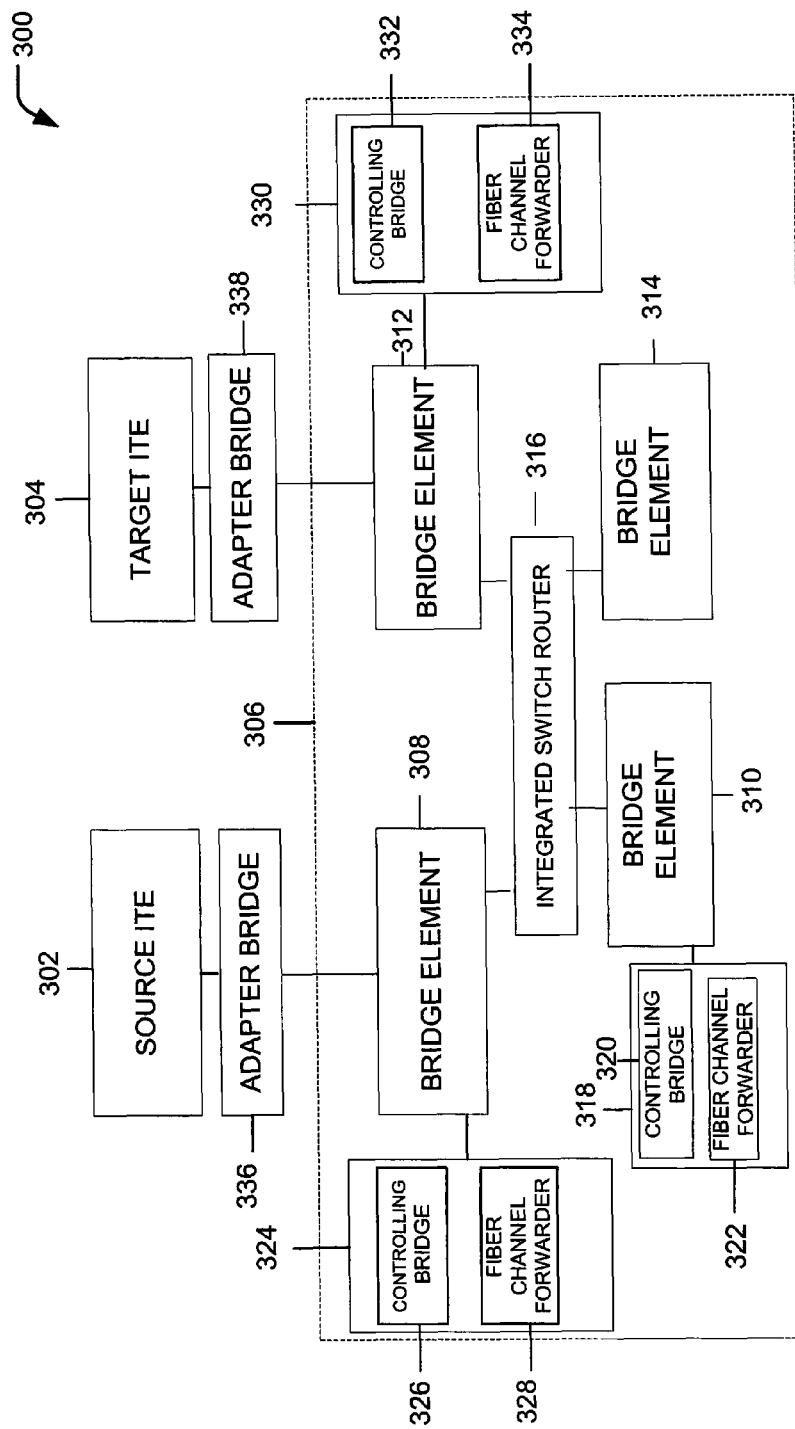
FIG. 3 is a diagram of a particular embodiment of a system configured to remotely program distributed switches using one or more controlling bridges.

FIG. 3 shows a particular illustrative embodiment of a highly integrated computer system configured to efficiently program distributed switches (e.g., bridge elements and adapter bridges) using a remote controlling bridge(s). More particularly, the system 300 may include a source ITE 302 that is coupled to a target ITE 304 via adapter bridges 236, 238 and a distributed virtual bridge 306. The distributed virtual bridge 306 may include multiple bridge elements 308, 310, 312, and 314 that are coupled via an integrated switch router 316. The adapter bridge 336 may be coupled to the bridge element 308, and the adapter bridge 338 may be coupled to the bridge element 312. More particularly, the adapter bridge 336 may be directly coupled via a cable (e.g., in a stacked configuration) to the bridge element 308. Similarly, the adapter bridge 338 may be stacked with the bridge element 312. In one respect, the distributed virtual bridge 306 may comprise a Converged Enhanced Ethernet (CEE) switch.

The distributed virtual bridge 306 may include a controlling bridge 320 and a Fiber Channel Forwarder 322 of an I/O blade computing device 318. The I/O blade computing device 318 may be directly coupled to the bridge element 310. For example, a cable may connect the I/O blade computing device 318 and the bridge element 310.

The controlling bridge 320 may be configured to interface with and program the bridge elements 308, 310, 312, and 314 and the adapter bridges 336, 338. For example, the controlling bridge 320 may be configured to generate and send a management frame to one or more of the bridge elements 308, 310, 312, and 314 and the adapter bridges 336, 338.

The management frame may include an instruction used to program the bridge elements 308, 310, 312, and 314 and the adapter bridges 336, 338. For example, an instruction may be executed to alter an operating parameter of the bridge elements 308, 310, 312, and 314 and the adapter bridges 336, 338. Illustrative operating parameters may relate to routing processes or stored data. For example, an instruction may affect how or to where certain data frames are routed. Another instruction may initiate the storage of updated address data at the bridge elements 308, 310, 312, and 314 or the adapter bridges 336, 338.

The management frame may include an Ether Type associated with a management protocol. The bridge elements 308, 310, 312, and 314 and the adapter bridges 336, 338 may recognize the Ether Type as being associated with a management frame that includes management data. In this manner, the controlling bridge 320 may be configured to concurrently program one or more of the bridge elements 308, 310, 312, and 314 and the adapter bridges 336, 338.

The bridge element 308 may be directly coupled to a computing device 324 (e.g., an I/O blade device) that includes a controlling bridge 326 and a Fiber Channel Forwarder 328. A computing device 330 may be directly coupled to the bridge element 312 and may include a controlling bridge 332 and a Fiber Channel Forwarder 334. The Fiber Channel Forwarders 322, 328, and 334 may be in communication with, or otherwise coupled to one another and the bridge elements 308, 310, 312, and 314 and the adapter bridges 336, 338. Similarly, the controlling bridges 320, 326, and 332 may be coupled to one another and the bridge elements 308, 310, 312, and 314 and the adapter bridges 336, 338.

FIG. 3 thus shows a highly integrated system 300 having controlling bridges 320, 326, and 332 that may each be configured to program one or all of the bridge elements 308, 310, 312, and 314 and the adapter bridges 336, 338. The controlling bridges 320, 326, and 332 may use management frames that include programming instructions to modify an operating parameter of the bridge elements 308, 310, 312, 314 and the adapter bridges 336, 338. The automated programming of the bridge elements 308, 310, 312, 314 and the adapter bridges 336, 338 may enable greater scalability and routing efficiency, while reducing administrator workload.

Figure 4:
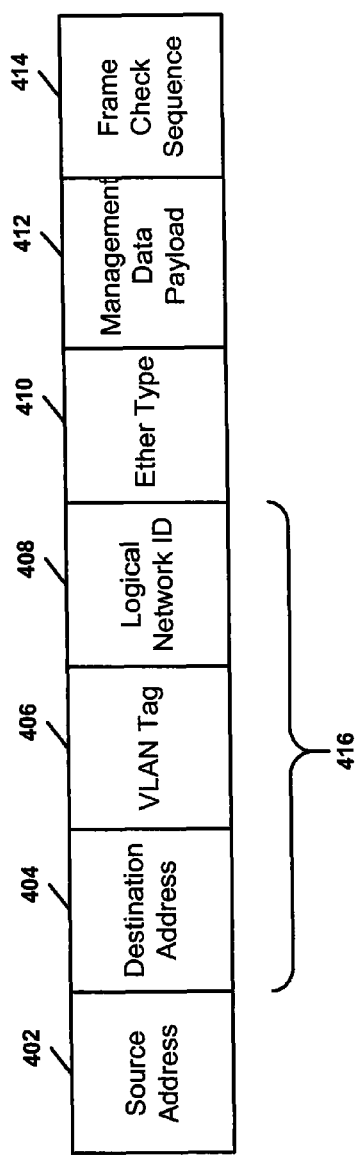
FIG. 4 is a diagram of a management frame configured to be forwarded by the system of FIG. 3.

FIG. 4 is an embodiment of an illustrative management frame 400 that may be generated by a controlling bridge, such as the controlling bridges 320, 326, and 332 of FIG. 3. The management frame 400 may include address data, such as MAC addresses (e.g., a source address 402) and a routing key used by the distributed virtual bridge 308 of FIG. 3 to forward the management frame 400.

In addition to the source address 402, the management frame 400 may include a destination address 404. The destination address 404 and the source address 402 may comprise MAC addresses. MAC addresses are typically constructed by a Fiber Channel Forwarder, such as the Fiber Channel Forwarder 328 of FIG. 3. An illustrative MAC address may include a combination of three-bytes of a destination identifier associated with a destination node (e.g., a MAC address of a server computer or virtual machine) with three-bytes of Fiber Channel (FC) mapping information assigned by the Fiber Channel Forwarder. A MAC address of an embodiment may include an Internet Protocol address. In FIG. 3, the source address 402 may be a MAC address of a controlling bridge, such as a controlling bridge 320, 326, or 332 of FIG. 3. The destination address may be a MAC address of a switch to be programmed, such as the bridge elements 308, 310, 312, 314 or the adapter bridges 336, 338 of FIG. 3.

A logical network identifier 406 may indicate a logical network associated with the management frame 400. For example, the logical network identifier 406 may be assigned to the switch to which the management frame 400 is addressed. A logical network may be included to provide an additional layer of traffic separation. A VLAN tag 408 may indicate a VLAN assigned to the management frame 400. The VLAN may be associated with multiple switches, such as the bridge elements 308, 310, 312, 314 and the adapter bridges 336, 338 of FIG. 3.

The Ether Type 410 of the management frame 400 may indicate a protocol of the payload 412. For example, the Ether Type 410 may indicate that the protocol of the payload 412 is a predetermined management protocol. The predetermined management protocol may be identified by a receiving switch, such as the bridge elements 308, 310, 312, 314 and the adapter bridges 336, 338 of FIG. 3. The management data of the payload 412 may be used to modify an operating parameter of the switch. The Ether Type of a non-management data frame may include FCoE. Such a data frame may be routed normally by the switch (e.g., without initiating switch configuration processes).

A Frame Check Sequence (FCS) 414 may include a checksum added to the management frame 400. The FCS 414 may facilitate error detection and correction.

The management frame 400 may be generated by a controlling bridge to manage multiple switches. Management frames may be routed through a network to concurrently program switches without burdening administrators with manual configuration tasks.

Figure 5:
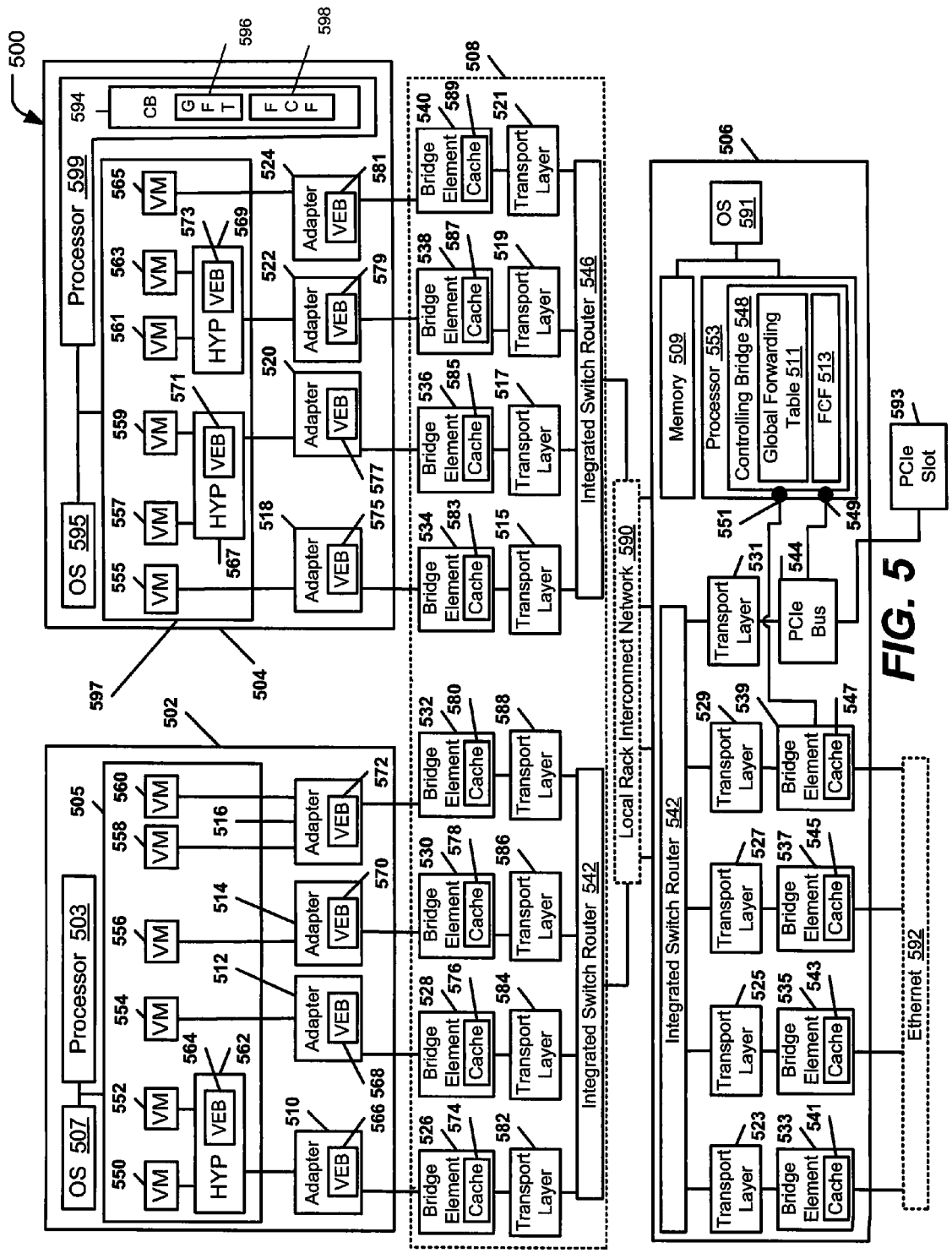
FIG. 5 is a diagram of another particular embodiment of a system configured to remotely program distributed switches using one or more controlling bridges.

Referring to FIG. 5, another particular illustrative embodiment of a highly integrated system 500 configured to program distributed switches is depicted. FIG. 5 generally shows a computer system 500 configured to forward data frames using a distributed virtual bridge 508. The distributed virtual bridge 508 may selectively forward management frames to distributed switches (e.g., bridge elements and adapters).

The distributed virtual bridge 508 may be similar to the distributed virtual bridge 306 of FIG. 3. The system 500 includes a first server computer 502 and a second server computer 504 that are both coupled to an I/O blade device 506 via the distributed virtual bridge 508. The server computers 502, 504 and the I/O blade device 506 may be housed within separate chassis and racks.

The distributed virtual bridge 508 may be coupled to multiple adapters 510, 512, 514, 516, 518, 520, 522, and 524. The adapters 510, 512, 514, 516, 518, 520, 522, and 524 may be located within or may be coupled to the server computers 502, 504. The distributed virtual bridge 508 may use multiple access points, or bridge elements 526, 528, 530, and 532-540 to couple to the server computers 502, 504. For example, a microchip that includes the bridge elements 526, 528, 530, and 532 may be cabled or otherwise coupled to a port of the server computer 502 that includes the adapter 510. As explained herein, the distributed virtual bridge 508 may functionally supplant chassis switches and top of rack switches with a frame-based network fabric that functions in a similar fashion to an Ethernet network.

One or more transport layer modules 582, 584, 586, and 588 coupled to the bridge elements 526, 528, 530, and 532 may provide a frame-based, Ethernet-like interface to one or more integrated switch routers 542. The transport layer module 582 may be configured to deconstruct a transmission of data frames so that packet information may be evenly distributed across links to a local rack interconnect 590. The data frames may not be serialized upon leaving the transport layer module 582. A receiving transport layer module 523 may serialize the data frames to achieve reliable, in-order delivery. If the receiving transport layer module 523 determines that data frame information is missing, the transport layer module 523 may initiate a process to recover the missing data. The translation process may be accomplished in hardware, which may provide a larger bandwidth and faster processing than software applications. The transport layer modules 582, 584, 586, and 588, the integrated switch router 542, and the local rack interconnect network 590 may combine to include an underlying lossless, point-to-point communication network (i.e., an integrated switch router network) between the server computers 502, 504 and the I/O blade device 506.

The bridge elements 526, 528, 530, and 532 may function as data link layer (i.e., Layer 2) bridge forwarders within the distributed virtual bridge 508. In particular embodiments, the bridge elements 526, 528, 530, and 532 may comprise a switch, or router device. The bridge elements 526, 528, 530, and 532 may include learned (e.g., received and stored) cached address data used to forward data frames throughout the distributed virtual bridge 508. The learned address data may correspond to one or both of a destination address and a source address associated with a data frame.

When the bridge element 526 does not include address data pertinent to a source or destination address of a received data frame, the bridge element 526 may query a controlling bridge 548 for the address data. The controlling bridge 548 may include a global forwarding table 511 that includes stored address data. The stored address data may be continuously updated by the bridge elements 526, 528, 530, and 532. For example, a bridge element 526 may send an update message to the controlling bridge 548 in response to learning an updated or new MAC address. A corresponding MAC address in the global forwarding table 511 may be subsequently updated.

Conversely, the address data of the global forwarding table 511 may be used to update the bridge elements 526, 528, 530, and 532. For example, the controlling bridge 548 may respond to a query from the bridge element 526 with requested address data. The bridge element 526 may cache the received address data for future use.

The first server computer 502 may comprise a blade server computer, such as the server computer 202 shown in FIG. 2. The first server computer 502 may include one or more virtual machines (VMs) 550, 552, 554, 556, 558, and 560. A virtual machine may include a software implementation of a computer and may execute programs in a manner similar to a physical machine.

FIG. 5 shows an illustrative hypervisor 562 that is coupled to both the virtual machine 550 and the virtual machine 552. The hypervisor 562 may include platform virtualization software that allows multiple operating systems to run concurrently on the first server computer 502. The hypervisor 562 may include a hypervisor virtual bridge 564 that allows direct communication between the virtual machines 550, 552 without traversal of an external network. In one embodiment, the hypervisor virtual bridge 564 may register address information with the controlling bridge 548.

The server computer 502 may include at least one processor 503 coupled to a memory 505. The processor 503 may represent one or more processors (e.g., microprocessors), and the memory 505 may represent random access memory (RAM) devices comprising the main storage of the server computer 502, as well as supplemental levels of memory, e.g., cache memories, non-volatile or backup memories (e.g., programmable or flash memories), read-only memories, etc. In addition, the memory 505 may be considered to include memory storage physically located in the server computer 502 or on another server computer 504 coupled to the server computer 502 via the distributed virtual bridge 508.

The first server computer 502 may operate under the control of an operating system (OS) 507 and may execute or otherwise rely upon various computer software applications, components, programs, objects, modules, and data structures, such as the virtual machines 550, 552, 554, 556, 558, and 560. Moreover, various applications, components, programs, objects, modules, etc. may also execute on one or more processors in another device coupled to the server computer 502 (e.g., in a distributed computing environment, where computing processes may be allocated to multiple server computers).

The first server computer 502 may include adapters 510, 512, 514, and 516, such as converged network adapters. A converged network adapter may include a single root I/O virtualization (SR-IOV) adapter, such as a Peripheral Component Interconnect Express (PCIe) adapter that supports Converged Enhanced Ethernet (CEE). The adapters 510, 512, 514, and 516 may be used to implement an FCoE protocol. Each adapter 510, 512, 514, and 516 may be coupled to one or more of the virtual machines 550, 552, 554, 556, 558, and 560. The adapters 510, 512, 514, and 516 may facilitate shared access of the virtual machines 550, 552, 554, 556, 558, and 560. While the adapters 510, 512, 514, and 516 are shown in FIG. 5 as being included within the server computer 502, adapters of another embodiment may include physically distinct devices that are separate from the server computers 502, 504.

Each adapter 510, 512, 514, and 516 may include a converged adapter virtual bridge 566, 568, 570, and 572. The converged adapter virtual bridges 566, 568, 570, and 572 may facilitate sharing of the adapters 510, 512, 514, and 516 by coordinating access by the virtual machines 550, 552, 554, 556, 558, and 560. Each converged adapter virtual bridge 566, 568, 570, and 572 may recognize data flows included within its domain. A recognized domain address may be routed directly, without processing or storage outside of the domain of the particular converged adapter virtual bridge 566, 568, 570, and 572. Each adapter 510, 512, 514, and 516 may include one or more CEE transmit ports that couple to one of the bridge elements 526, 528, 530, and 532. In another embodiment, bridge elements may be co-located with the adapters, and coupling between adapters and the bridge elements may not be Ethernet connections.

The bridge elements 526, 528, 530, and 532 may be configured to forward data frames throughout the distributed virtual bridge 508. The bridge elements 526, 528, 530, and 532 may thus function as access points for the distributed virtual bridge 508 by translating between Ethernet and the integrated switch router 542. The bridge elements 526, 528, 530, and 532 may not include buffers and may support CEE at boundaries of the distributed virtual bridge 508. In another embodiment, the bridge elements 526, 528, 530, and 532 may include buffers.

Each bridge element 526, 528, 530, and 532 of the distributed virtual bridge 508 may include a forwarding cache 574, 576, 578, and 580. A forwarding cache 574, 576, 578, and 580 may include a lookup table that stores address data used to forward data frames that are received by the bridge elements 526, 528, 530, and 532. For example, the bridge element 526 may compare address data associated with a received data frame to the address data stored within the forwarding cache 574.

Illustrative address data may include routing information, such as a routing key included within header data of the data frame. The routing key may include at least one of a virtual local area network (VLAN) tag and a logical network identifier, as well as a MAC address. The MAC address may be generated and assigned by a Fiber Channel Forwarder (FCF) 513, as set by an administrator or computing system. The Fiber Channel Forwarder 513, or FCoE switch, may facilitate connectivity between FCoE initiators and Fiber Channel fabrics. To illustrate, an FCoE data frame sent from the first virtual machine 558 and intended for a second virtual machine 563 may be addressed to the Fiber Channel Forwarder 513 in accordance with the FCoE standard. According to standard routing procedures, the Fiber Channel Forwarder 513 may receive and readdress the FCoE data frame for forwarding to the virtual machine 563.

The MAC address of the Fiber Channel Forwarder 513 may have been learned by the first server computer 502 during a discovery phase, when the Fiber Channel Forwarder 513 establishes communications with networked devices. During the discovery phase, the second server computer 504 may respond to broadcast queries from the first server computer 502. The Fiber Channel Forwarder 513 may discover the second server computer 504 from the query responses. After the discovery phase, a login phase may be initiated. A MAC address of the server computer 504 may be reassigned by the Fiber Channel Forwarder 513. The reassigned MAC address may be used for subsequent routing and communications between the server computers 502, 504. The Fiber Channel Forwarder 513 may facilitate storage of MAC addresses assigned to the server computers 502, 504.

A VLAN tag may indicate an assigned VLAN, which may be used to segregate traffic and to allow more than one uplink. There may be multiple VLANs on an uplink. Conventionally, each VLAN may use only one uplink port. That is, only one physical uplink port at a given time may be used to forward a data frame associated with a particular VLAN. Through the use of logical networks, a VLAN may use multiple physical ports to forward traffic while maintaining traffic segregation. Link aggregation may be used to bundle several physical links to act as one uplink with higher bandwidth.

A logical network may include a logically specified network portion of the distributed virtual bridge 508. Multiple logical networks may be included within a single bridge element. As such, a logical network may provide an additional layer of traffic separation. When so configured, logical networks may allow different customers to use the same VLAN tag. The VLANs of each customer may remain segregated by virtue of the different logical networks.

The forwarding caches 574, 576, 578, and 580 of the distributed virtual bridge 508 may have a format similar to the global forwarding table 511 of the controlling bridge 548. The forwarding caches 574, 576, 578, and 580 may have smaller memory capacities than the global forwarding table 511. The forwarding caches 574, 576, 578, and 580 may further be updated with address data learned from data frames that flow through the bridge elements 526, 528, 530, and 532.

The address data may additionally be updated with address data received from the global forwarding table 511. Invalid or changed address data that is updated within one or more of the forwarding caches 574, 576, 578, and 580 of the bridge elements 526, 528, 530, and 532 may be communicated to the global forwarding table 511 of the controlling bridge 548. For example, the bridge element 526 may learn a new MAC address of a newly added device that is configured to receive from or send data to the distributed virtual bridge 508.

The bridge element 526 may verify that a source MAC address included within a received data frame is allowed at a port by checking a list stored within a memory. The bridge element 526 may send a registration message to the controlling bridge 548 to update the global forwarding table 511 with the verified MAC address. The bridge element 526 may further store the MAC address within the forwarding cache 574. In another example, the bridge element 526 may identify a MAC address that is infrequently used. This infrequently used MAC address may be removed from the forwarding cache 574 to make storage room available for other MAC addresses. The bridge element 526 may send an update message to the controlling bridge 548 to have the MAC address removed from the global forwarding table 511.

Address data stored within the global forwarding table 511 may be communicated to one or more forwarding caches 574, 576, 578, and 580 of the distributed virtual bridge 508. For example, the bridge element 526 may receive a data frame that includes a destination MAC address that is not stored within the forwarding cache 574. To obtain information for forwarding the data frame, the bridge element 526 may send a query to a bridge element 539 configured to access the controlling bridge 548. The bridge element 539 may search the global forwarding table 511 for address data associated with the destination MAC address. If the address data is found, the bridge element 539 may forward the MAC address through the distributed virtual bridge 508 to the querying bridge element 526. The bridge element 526 may store the MAC address as address data within the forwarding cache 574. As with the global forwarding table 511, the address data included within the forwarding caches 574, 576, 578, and 580 of the distributed virtual bridge 508 may include both internal address information, as well as addresses that are external to the system 500.

Each of the bridge elements 526, 528, 530, and 532 may be connected to one or more transport layer modules 582, 584, 586, and 588. The transport layer modules 582, 584, 586, and 588 may include buffering used for attachment to the integrated switch router 542. The transport layer modules 582, 584, 586, and 588 may further provide a frame-based, Ethernet-like interface to the integrated switch router 542.

The transport layer modules 582, 584, 586, and 588 may each include a shared buffer used to transmit frames across the integrated switch router 542. Additional buffers of the transport layer modules 582, 584, 586, and 588 may be used to receive data frames from the integrated switch router 542. The buffers may be divided into different virtual lanes. Virtual lanes may include logically separated paths for data frame traffic flowing between a bridge element and a transport layer module. For example, there may be four virtual lanes between the bridge element 526 and the transport layer module 582. The transport layer modules 582, 584, 586, and 588 may include logic to recover from faulty microchips and links between a source and a destination. The transport layer modules 582, 584, 586, and 588 may maintain a strict ordering of packets within a particular virtual lane regardless of each data frame's path through the local rack interconnect network 590 and the computer system 500.

The integrated switch router 542 may communicate with the transport layer modules 582, 584, 586, and 588 and may facilitate routing and packet delivery to and from the local rack interconnect network 590. The local rack interconnect network 590 may include links to the bridge elements 526, 528, 530, and 532 located within the same chassis and rack, as well as links to the bridge elements 534-540 in different chassis and racks. The local rack interconnect network 590 may include point-to-point connections, or pipes, between the bridge elements 526, 528, 530, 532, and 533-540 of the distributed virtual bridge 508 with no frame loss and with in-order frame delivery.

The second server computer 504 may include a server computer similar to the first server computer 502 and may be similar to the server computer 302 of FIG. 3. As such, the second server computer 504 may be located within a different chassis and rack than the first server computer 502. Similar to the first server computer 502, the second server computer 504 may include a processor 599 coupled to a memory 597 and to an operating system 595. The processor 599 may include a controlling bridge (CB) 594, a global forwarding table (GFT) 596, and a Fiber Channel Forwarder (FCF) 598. The second server computer 504 may further include virtual machines 555, 557, 559, 561, 563, and 565.

A hypervisor 567 may be coupled to the virtual machines 557, 559. The hypervisor 567 may include a hypervisor virtual bridge 571 that allows direct communication between the virtual machines 557, 559. A hypervisor virtual bridge 573 of a hypervisor 569 coupled to the virtual machines 561, 563 may facilitate direct communication between the virtual machines 561, 563. For example, the hypervisor virtual bridges 571, 573 may register address data with the controlling bridge 548.

The second server computer 504 may also include one or more adapters 518, 520, 522, and 524, such as converged CEE network adapters. Each adapter 518, 520, 522, and 524 may be coupled to one or more of the virtual machines 555, 557, 559, 561, 563, and 565. The adapters 518, 520, 522, and 524 may each include a converged adapter virtual bridge 575, 577, 579, and 581. The converged adapter virtual bridges 575, 577, 579, and 581 may facilitate sharing of the adapters 518, 520, 522, and 524 by coordinating virtual machine access. The adapters 518, 520, 522, and 524 may each couple to one or more of the bridge elements 534, 536, 538, and 540 of the distributed virtual bridge 508. Each adapter 518, 520, 522, and 524 may include one or more CEE transmit ports that couple to one of the bridge elements 534, 536, 538, or 540.

Each bridge element 534, 536, 538, and 540 may include a forwarding cache 583, 585, 587, and 589 that includes address data used to forward data frames that are received by the bridge elements 534, 536, 538, and 540. The bridge elements 534, 536, 538, and 540 may each be connected to one or more transport layer modules 515, 517, 519, and 521. The transport layer modules 515, 517, 519, and 521 may include buffering used for the attachment to the integrated switch router 546. The transport layer modules 515, 517, 519, and 521 may further provide a frame-based, Ethernet-like interface to the integrated switch router 546 and may maintain packet ordering. A portion of the distributed virtual bridge 508 shown in FIG. 5 as located above the local rack interconnect network 590 and as associated with the server computers 502, 504 may be referred to as a north portion. The bridge elements 526, 528, 530, 532, 534, 536, 538, and 540 may be coupled to the adapters 510, 512, 514, 516, 518, 520, 522, and 524.

The I/O blade device 506 may be the I/O server computer 202 of FIG. 2. As such, the I/O blade device 506 may allow uplink connectivity to an external Ethernet network 592 via an integrated switch router 501 that is coupled to transport layer modules 523, 525, 527, 529, and 531.

The transport layer modules 523, 525, 527, 529, and 531 may each couple to a bridge element 533, 535, 537, and 539. The bridge elements 533, 535, 537, and 539 may each include a forwarding cache 541, 543, 545, and 547. The I/O blade device 506 may be categorized as being included within a south portion of the distributed virtual bridge 508 because the bridge elements 533, 535, 537, and 539 may be coupled to an uplink to the Ethernet 592.

The I/O blade device 506 may include a memory 509, an operating system 591, and a processor 553 that includes the controlling bridge 548. The bridge element 539 may be coupled to the processor 553 via an Ethernet link connection 551. The transport layer module 531 may be coupled to a PCIe bus 544 that is coupled via a PCIe link connection 549 to the processor 553 and the controlling bridge 548. The PCIe bus 544 may also be coupled to a PCIe slot 593.

The controlling bridge 548 may communicate with the bridge elements 526, 528, 530, and 532-540 and other controlling bridges (not shown) of the computer system 500. The controlling bridge 548 may include firmware executing on the processor 553 that manages the bridge elements 526, 528, 530, and 532-540. For example, the controlling bridge 548 may be configured to divide a workload between the bridge elements 526, 528, 530, and 532-540, as well as perform synchronization procedures and failover operations.

The controlling bridges 548, 594 may be configured to interface with and program the bridge elements 526, 528, 530, 532-540 and the adapter bridges 566, 568, 570, 572, 575, 577, 579, 581. More particularly, the controlling bridge 320 may be configured to generate and send a management frame to one or more of the bridge elements 526, 528, 530, 532-540 and the adapter bridges 566, 568, 570, 572, 575, 577, 579, 581. The management frames may include instructions used to program operating parameters of the bridge elements 526, 528, 530, 532-540 and the adapter bridges 566, 568, 570, 572, 575, 577, 579, 581 and other switches.

The controlling bridge 548 may include the Fiber Channel Forwarder 513. FCoE may offer the capability to transport fiber channel payloads on top of an Ethernet network. The Fiber Channel Forwarder 513 may execute the Fiber Channel Initialization Protocol to discover and initialize FCoE capable entities connected to an Ethernet cloud. The Fiber Channel Forwarder 513 may further include firmware that encapsulates and de-encapsulates Fiber Channel data frames (e.g., FCoE formatted data frames). In at least one embodiment, the Fiber Channel Forwarder 513 may translate between Ethernet and Fiber Channel protocols.

The controlling bridge 548 may additionally include the global forwarding table 511. The global forwarding table 511 may include address data (e.g., MAC addresses) that is registered and maintained through communication and cooperation with the bridge elements 526, 528, 530, and 532-540, and in some cases, the hypervisors 562, 567, and 569.

In one example, the global forwarding table 511 may maintain MAC addresses that have been learned by a bridge element 526. The bridge element 526 may register the address data with the controlling bridge 548. The controlling bridge 548 may update the global forwarding table 511 by adding the address data to the global forwarding table 511. Similarly, the bridge element 526 may cause the controlling bridge 548 to update the global forwarding table 511 by sending an update message to the controlling bridge 548. The update message may cause the controlling bridge 548 to delete a MAC address that has been aged out by the bridge element 526. A MAC address may further be deleted when the bridge element 526 has detected that the address data is no longer valid.

In another example, the hypervisor virtual bridge 564 may register MAC addresses or other address data with the controlling bridge 548. The global forwarding table 511 may include address data associated with addresses that are included within the system 500, as well as addresses that are external to the system 500.

FIG. 5 thus shows an embodiment of a system 500 that includes a distributed virtual bridge 508 configured for lossless, point-to-point, in-order data frame delivery. The system 500 may support Fiber channel over Ethernet (FCoE) and may be scalable to include hundreds or more server computers. The controlling bridges 548, 594 may be configured to interface with and program the bridge elements 526, 528, 530, 532-540 and the adapter bridges 566, 568, 570, 572, 575, 577, 579, 581 to reduce administrator workloads.

Figure 6:
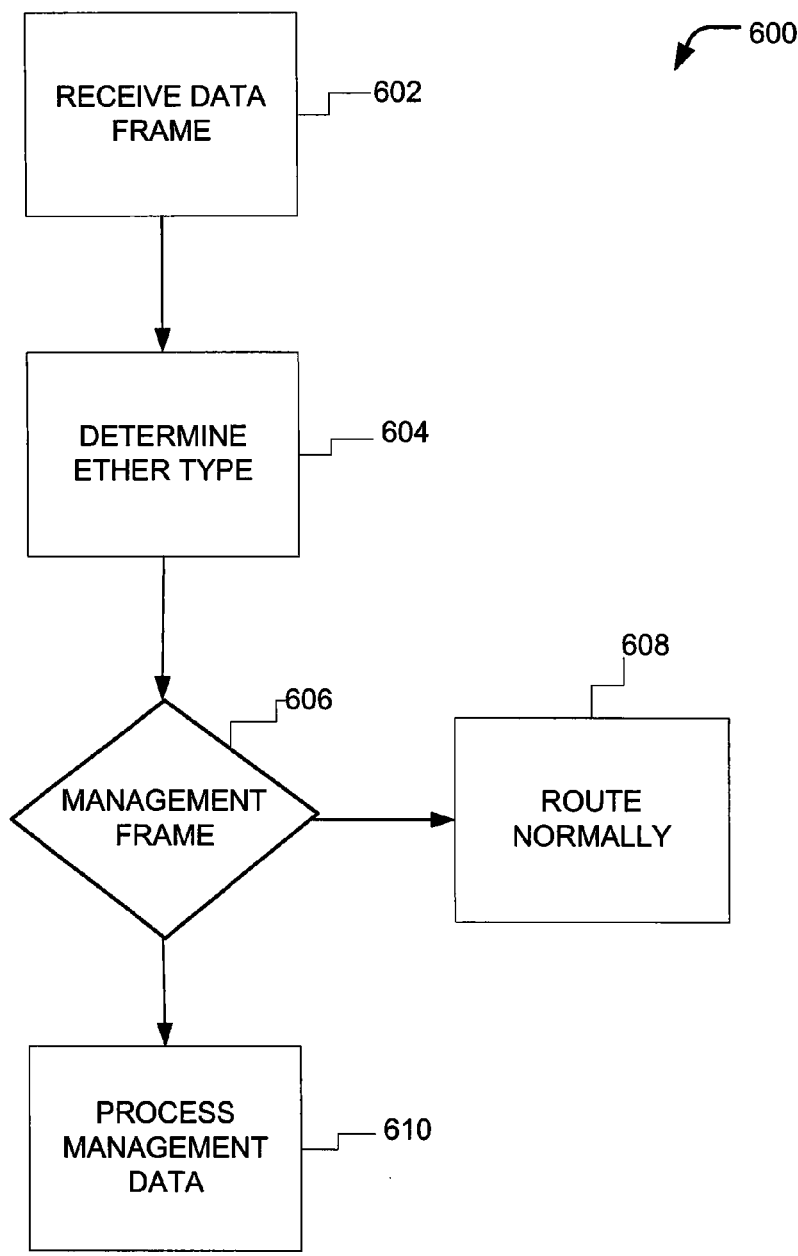
FIG. 6 is a flow diagram of a particular embodiment of a method to identify and process a management frame at a switch.

FIG. 6 is a flow diagram of an embodiment of a method of programming a switch using a management frame and is generally designated 600. In a particular embodiment, the method 600 is performed by at least one of the bridge elements 308, 310, 312, 314 and adapter bridges 336, 338 of the system 300 of FIG. 3.

At 602, a switch may receive a data frame. The switch may determine an Ether Type of the data frame, at 604. For instance, the switch may evaluate the Ether Type 410 of FIG. 4.

At 606, the switch may determine whether the data frame is a management frame. For example, the bridge element 308 of FIG. 3 may determine that a received data frame is a management frame. The management frame may be generated by a controlling bridge and include instructions operable to program an operating parameter of the switch.

A (non-management) data frame, as determined at 606, may be routed normally, at 608. For instance, the bridge element 308 of FIG. 3 may route a data frame to a target ITE 304 without initiating switch configuration processes.

When a management frame is identified at 606, management data may be processed, at 610. For example, the bridge element 308 of FIG. 3 may process an instruction of the management frame to modify an operating parameter of the bridge elements 308. An illustrative operating parameter may relate to a routing process or data storage. For example, an instruction may affect how or to where certain data frames are routed. Another instruction may initiate the storage of updated address data at the bridge elements.

Figure 7:
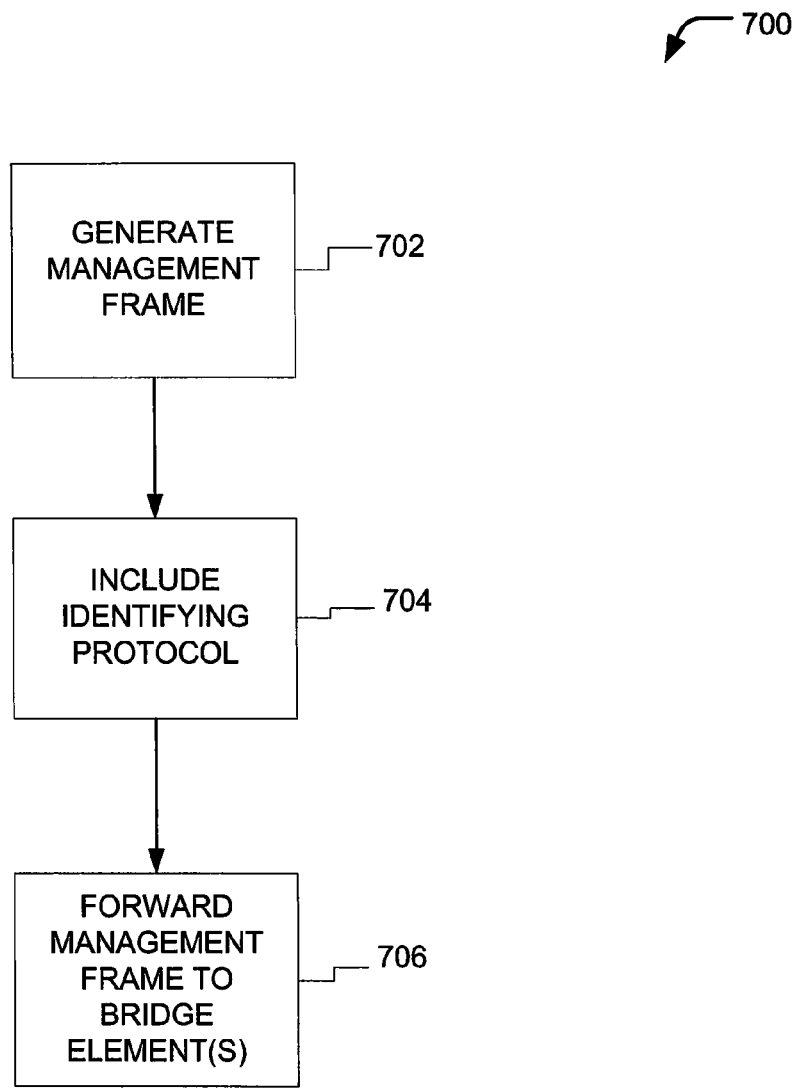
FIG. 7 is a flow diagram of a particular embodiment of a method to generate and forward a management frame to a switch to be configured.

FIG. 7 is a flow diagram of an embodiment of a method of programming a switch and is generally designated 700. In a particular embodiment, the method 700 is performed by at least one of the controlling bridges 320, 322, and 332 of the system 300 of FIG. 3.

At 702, a management frame may be generated. For example, the controlling bridge 320 of FIG. 3 may generate a management frame. The management frame may include instructions to modify an operating parameter or otherwise program a switch.

An identifying protocol may be included in the management frame, at 704. For instance, the controller 320 of FIG. 3 may include an Ether Type that is associated with management protocol within the management frame. The switch receiving the management frame may identify the management protocol.

At 706, the management frame may be forwarded to one or more switches. For example, the controller 320 of FIG. 3 may forward the management frame to one or more of the bridge elements 308, 310, 312, 314 and adapter bridges 336, 338.

FIGS. 6 and 7 thus show methods of programming switches using management frames. The methods may facilitate automated programming in a manner that reduces administrator workload. Increased programming efficiencies may enable greater scalability and accuracy in highly integrated environments.

Particular embodiments described herein may take the form of an entirely hardware embodiment, an entirely software embodiment or an embodiment containing both hardware and software elements. In a particular embodiment, the disclosed methods are implemented in software that is embedded in processor readable medium and executed by a processor, which includes but is not limited to firmware, resident software, microcode, etc.

Further, embodiments of the present disclosure, such as the one or more embodiments may take the form of a computer program product accessible from a computer-usable or computer-readable medium providing program code for use by or in connection with a computer or any instruction execution system. For the purposes of this description, a computer-usable or computer-readable medium can be any apparatus that can tangibly embody a computer program and that can contain, store, communicate, propagate, or transport the program for use by or in connection with the instruction execution system, apparatus, or device.

In various embodiments, the medium can include an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the data processing system either directly or through intervening I/O controllers.

Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

The invention claimed is:

1. An apparatus comprising:
a plurality of racks, wherein each rack of the plurality of racks includes a plurality of chassis, wherein each chassis of the plurality of chassis includes a plurality of server computers;
a distributed virtual bridge coupled to the plurality of server computers, wherein the distributed virtual bridge is coupled to a plurality of adapters and the plurality of adapters is located within, coupled, or any combination thereof to the plurality of server computers, and wherein the distributed virtual bridge comprises:
a plurality of bridge elements coupled to the plurality of server computers, wherein each bridge element of the plurality of bridge elements is configured to forward data frames between the plurality of server computers of different racks of the Plurality of racks, different chassis of the plurality of chassis, or any combination thereof, and wherein each bridge element of the plurality of bridge elements includes a forwarding cache to store address data used to forward the data frames received by the bridge element; and
a plurality of controlling bridges coupled to one another and coupled to the plurality of bridge elements, wherein each controlling bridge of the controlling bridges is configured to generate and send management frames to the plurality of bridge elements, wherein the management frames include instructions used to program the plurality of bridge elements, and wherein each controlling bridge of the plurality of controlling bridges includes a global forwarding table to store address data received from the plurality of bridge elements, provide address data to the plurality of bridge elements, or any combination thereof accordingly.

2. The apparatus of claim 1, wherein at least one of the management frames includes an ether type associated with a management protocol.

3. The apparatus of claim 2, wherein at least one bridge element of the plurality of bridge elements is configured to identify the ether type.

4. The apparatus of claim 1, wherein the distributed virtual bridge comprises an integrated switch router configured to route the data frames.

5. The apparatus of claim 4, wherein the distributed virtual bridge further comprises a transport module coupled to a bridge element of the plurality of bridge elements and configured to provide a frame-based interface to the integrated switch router.

6. The apparatus of claim 1, wherein at least one of the plurality of bridge elements comprises an adapter bridge.

7. The apparatus of claim 1, wherein the plurality of bridge elements are directly coupled to one another.

8. The apparatus of claim 1, wherein a controlling bridge of the plurality of controlling bridges is configured to concurrently program multiple bridge elements of the plurality of bridge elements.

9. The apparatus of claim 1, wherein the plurality of bridge elements are associated with a virtual local area network.

10. The apparatus of claim 1, wherein the plurality of controlling bridges is configured to divide a workload, perform synchronization, perform failover operations, or any combination thereof between the plurality of bridge elements.

11. The apparatus of claim 1, wherein the plurality of controlling bridges is coupled to a plurality of adapter bridges.

12. A method of programming a bridge element, the method comprising:
  for a plurality of racks, wherein each rack of the plurality of racks includes a plurality of chassis, wherein each chassis of the plurality of chassis includes a plurality of server computers, receiving a data frame at a switch bridge element of a plurality of bridge elements of a distributed virtual bridge, wherein the data frame is forwarded from a controlling bridge of a plurality of controlling bridges of the distributed virtual bridge, wherein the distributed virtual bridge is coupled to the plurality of server computers, wherein the distributed virtual bridge is coupled to a plurality of adapters and the plurality of adapters is located within, coupled, or any combination thereof to the plurality of server computers and wherein the distributed virtual bridge comprises:
    the plurality of bridge elements coupled to the plurality of server computers, wherein each bridge element of the plurality of bridge elements is configured to forward data frames between the plurality of server computers of different racks of the plurality of racks, different chassis of the plurality of chassis, or any combination thereof, and wherein each of the plurality of bridge elements include a forwarding cache to store address data used to forward the data frames received by the bridge element, and
   the plurality of controlling bridges coupled to one another and coupled to the plurality of bridge elements, wherein each controlling bridge of the plurality of controlling bridges is configured to generate and send management frames to the plurality of bridge elements, wherein the management frames include instructions used to program the plurality of bridge elements, and wherein each controlling bridge of the plurality of controlling bridges includes a global forwarding table to store address data received from the plurality of bridge elements, provide address data to the plurality of bridge elements, or any combination thereof accordingly;
  determining that the data frame includes management data; and
  modifying an operating parameter of the bridge element based upon the management data.

13. The method of claim 12, wherein determining the data frame includes management data includes identifying a predetermined protocol of the data frame.

14. The method of claim 13, wherein the predetermined protocol includes an ether type.

15. The method of claim 12, further comprising identifying a non-management related protocol of another data frame, and based upon the non-management related protocol, forwarding the other data frame according to a normal routing scheme.

16. The method of claim 12, wherein the bridge element includes a virtual ethernet bridge.

17. The method of claim 12, wherein the bridge element includes an adapter bridge.

18. The method of claim 12, wherein the plurality of controlling bridges is coupled to a plurality of adapter bridges.

19. A method of programming a bridge element, the method comprising:
  for a plurality of racks, wherein each rack of the plurality of racks includes a plurality of chassis, wherein each chassis of the plurality of chassis includes a plurality of server computers, generating a management frame at a controlling bridge of a plurality of controlling bridges of a distributed virtual bridge, wherein the management frame is configured to modify an operating parameter of a bridge element of a plurality of bridge elements of a distributed bridge coupled to the controlling bridge and includes a protocol identifying the management frame to the bridge element, wherein the distributed virtual bridge is coupled to the plurality of server computers, wherein the distributed virtual bridge is coupled to a plurality of adapters and the plurality of adapters is located within, coupled, or any combination thereof to the plurality of server computers, and wherein the distributed virtual bridge comprises:
    the plurality of bridge elements coupled to the plurality of server computers, wherein each bridge element plurality of bridge elements is configured to forward data frames between the plurality of server computers of different racks of the plurality of racks, different chassis of the plurality of chassis, or any combination thereof, and wherein each of the plurality of bridge elements include a forwarding cache to store address data used to forward the data frames received by the bridge element, and
    the plurality of controlling bridges coupled to one another and coupled to the plurality of bridge elements, wherein each controlling bridge of the plurality of controlling bridges is configured to generate and send management frames to the plurality of bridge elements, wherein the management frames include instructions used to program the plurality of bridge elements, and wherein each controlling bridge of the plurality of controlling bridges includes a global forwarding table to store address data received from the plurality of bridge elements, provide address data to the plurality of bridge elements, or any combination thereof accordingly; and
  forwarding the management frame to the bridge element.

20. The method of claim 19, wherein the controlling bridge is configured to concurrently program the plurality of bridge elements.

21. The method of claim 19, further comprising assigning a media access control address to the bridge element.

22. The method of claim 19, further comprising associating a virtual local area network with the plurality of bridge elements.

23. The method of claim 19, wherein the plurality of controlling bridges is coupled to a plurality of adapter bridges.

24. A program product, comprising:

program code resident at a bridge element of a plurality of bridge elements of a distributed virtual bridge and configured to, for a plurality of racks, wherein each rack of the plurality of racks includes a plurality of chassis, wherein each chassis of the plurality of chassis includes a plurality of server computers, determine that a data frame includes management data and to modify an operating parameter of the bridge element, wherein the distributed virtual bridge is coupled to the plurality of server computers, wherein the distributed virtual bridge is coupled to a plurality of adapters and the plurality of adapters is located within, coupled, or any combination thereof to the plurality of server computers, and wherein the distributed virtual bridge comprises:

the plurality of bridge elements coupled to the plurality of server computers, wherein each bridge element of the plurality of bridge elements is configured to forward data frames between the plurality of server computers of different racks of the plurality of racks, different chassis of the plurality of chassis, or any combination thereof, and wherein each of the plurality of bridge elements include a forwarding cache to store address data used to forward the data frames received by the bridge element, and a plurality of controlling bridges coupled to one another and coupled to the plurality of bridge elements, wherein each controlling bridge of the plurality of controlling bridges is configured to generate and send management frames to the plurality of bridge elements, wherein the management frames include instructions used to program the plurality of bridge elements, and wherein each controlling bridge of the plurality of controlling bridges includes a global forwarding table to store address data received from the plurality of bridge elements, provide address data to the plurality of bridge elements, or any combination thereof accordingly; and a computer readable non-transitory medium bearing the program code.

25. The program product of claim 24, wherein the plurality of controlling bridges is coupled to a plurality of adapter bridges.

* * * * *